United States Patent
Pan et al.

(10) Patent No.: US 10,583,419 B2
(45) Date of Patent: Mar. 10, 2020

(54) RESIN NANOCOMPOSITE, METHOD FOR PREPARING THE SAME, AND METHOD FOR TREATING SEWAGE WITH THE SAME

(71) Applicant: Nanjing University, Nanjing (CN)

(72) Inventors: Bingcai Pan, Nanjing (CN); Xiaolin Zhang, Nanjing (CN); Siyuan Pan, Nanjing (CN); Cheng Cheng, Nanjing (CN); Zefang Chen, Nanjing (CN)

(73) Assignee: NANJING UNIVERSITY, Nanjing ( * ) Notice: Subject to any disclaimer, the term of this patent is extended or adjusted under 35 U.S.C. 154(b) by 155 days.

(21) Appl. No.: 15/708,091

(22) Filed: Sep. 18, 2017

(65) Prior Publication Data

US 2018/0015441 A1 Jan. 18, 2018

Related U.S. Application Data

(63) Continuation-in-part of application No. PCT/CN2017/071884, filed on Jan. 20, 2017.

(30) Foreign Application Priority Data

Jul. 15, 2016 (CN) .......................... 2016 1 0555717

(51) Int. Cl.
  *B01J 20/26* (2006.01)
  *B01J 20/28* (2006.01)
  (Continued)

(52) U.S. Cl.
  CPC ......... *B01J 20/265* (2013.01); *B01J 20/0222* (2013.01); *B01J 20/0229* (2013.01);
  (Continued)

(58) Field of Classification Search
  None
  See application file for complete search history.

(56) References Cited

U.S. PATENT DOCUMENTS

2013/0310243 A1* 11/2013 Pan ..................... C23C 18/1216
                                                                          502/5

FOREIGN PATENT DOCUMENTS

| CN | 102102198 A | * | 6/2011 | ......... C23C 18/1658 |
| CN | 106179264 A | * | 12/2016 | ............. B01J 20/26 |
| WO | WO-2012025943 A1 | * | 3/2012 | .......... B01J 20/2803 |

* cited by examiner

*Primary Examiner* — Clare M Perrin
(74) *Attorney, Agent, or Firm* — Matthias Scholl P.C.; Matthias Scholl

(57) ABSTRACT

A resin nanocomposite, including a resin skeleton structure and nanoparticles. The resin skeleton structure is an aminated polystyrene. The nanoparticles are dispersed in the resin skeleton structure. The specific area of the nanocomposite is between 50 and 300 $m^2/g$, and the pore size thereof is between 5 and 40 nm. The invention also provides a method for preparing the resin nanocomposite, the method including: 1) mixing and dissolving a linear polyethylene with a chloromethyl polystyrene or a polyvinyl chloride to yield a polymer solution, and adding the nanoparticles to the polymer solution; 2) adding an alcohol solution to liquid nitrogen; adding the mixed solution dropwise to the liquid nitrogen to yield a mixture; allowing the mixture to stand; collecting, washing and drying resin beads to yield a composite material; and 3) adding the composite material to an amine solution for reaction, and washing and drying the resulting product.

11 Claims, 9 Drawing Sheets

(51) Int. Cl.
*C02F 1/28* (2006.01)
*B01J 41/14* (2006.01)
*B01J 20/02* (2006.01)

(52) U.S. Cl.
CPC ..... *B01J 20/0233* (2013.01); *B01J 20/28007* (2013.01); *B01J 20/28059* (2013.01); *B01J 20/28061* (2013.01); *B01J 41/14* (2013.01); *C02F 1/288* (2013.01); *C02F 1/285* (2013.01); *C02F 2305/08* (2013.01)

RESIN NANOCOMPOSITE, METHOD FOR PREPARING THE SAME, AND METHOD FOR TREATING SEWAGE WITH THE SAME

CROSS-REFERENCE TO RELATED APPLICATIONS

This application is a continuation-in-part of International Patent Application No. PCT/CN2017/071884 with an international filing date of Jan. 20, 2017, designating the United States, now pending, and further claims foreign priority benefits to Chinese Patent Application No. 201610555717.1 filed Jul. 15, 2016. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a resin nanocomposite, a method for preparing the same, and a method for treating sewage with the same.

Description of the Related Art

Typical resin nanocomposites and methods of preparing the same suffer from the following problems: the content and the appearance of the nanoparticles are difficult to control; and the pore structures are insufficient, disordered, and easily obstructed. In addition, the polymer carriers of the nanocomposites do not contain charged groups and exhibit strong hydrophobicity. This inhibits the diffusion of polar substances in the resins, and the nanocomposites are incompatible with aqueous phase systems.

SUMMARY OF THE INVENTION

In view of the above-described problems, it is one objective of the invention to provide a resin nanocomposite, a method for preparing the same, and a method for treating sewage by using the same. The preparation process includes pre-mixing, cold crystallization for pore formation, cross-linking and amination. Through the method of the present disclosure, the resin pore structures, ion exchange capacity, and the content of the nanoparticles can be expediently controlled.

To achieve the above objective, in accordance with one embodiment of the invention, there is provided a resin nanocomposite. The resin nanocomposite comprises a resin skeleton structure and nanoparticles. The resin skeleton structure is an aminated polystyrene. The nanoparticles are dispersed in the resin skeleton structure. A specific area of the nanocomposite is between 50 and 300 $m^2/g$, and a pore size thereof is between 5 and 40 nm.

In a class of this embodiment, an anion exchange capacity of the nanocomposite is between 0.5 and 3.0 mmol/g, and the nanoparticles account for between 1 and 30 percent by weight of total weight of the nanocomposite.

In a class of this embodiment, characteristic absorption peaks are present at 1650-1630 $cm^{-1}$, 1230-1200 $cm^{-1}$, and <1000 $cm^{-1}$ in an infrared spectrum of the nanocomposite and respectively correspond to an N—H bending vibration, a C—N stretching vibration, and the nanoparticles.

In a class of this embodiment, the nanoparticles are iron oxide nanoparticles, manganese oxide nanoparticles, zero-valent iron nanoparticles, or/and noble metal nanoparticles.

In a class of this embodiment, a diameter of each of the nanoparticles is between 1 and 40 nm.

In a class of this embodiment, the noble metal is gold, silver, platinum, or palladium.

In accordance with another embodiment of the invention, there is provided a method for preparing the resin nanocomposite. The method comprises:

1) mixing and dissolving a linear polyethylene with a chloromethyl polystyrene or a polyvinyl chloride in an organic solvent to yield a polymer solution, and adding the nanoparticles to the polymer solution to yield a mixed solution;
2) adding an alcohol solution to liquid nitrogen; adding the mixed solution dropwise obtained from 1) to the liquid nitrogen to yield a mixture after the alcohol solution is completely condensed; allowing the mixture to stand for between 5 and 48 hrs until the liquid nitrogen is evaporated and the alcohol solution is completely melted; collecting resin beads therefrom, washing the resin beads for between 3 and 5 times by an alcohol, and drying the resin beads to yield a composite material; and
3) adding the composite material obtained from 2) to an amine solution for reaction, washing a resulting product by an alcohol solution for between 3 and 5 times, and drying the product to yield the resin nanocomposite.

In a class of this embodiment, in 1), the linear polyethylene in 1) has a molecular weight of between 190 thousand and 1 million; a weight of the chloromethyl polystyrene or the polyvinyl chloride accounts for between 0.15 and 0.8-fold of a weight of the linear polyethylene; and a total weight of the linear polyethylene and the chloromethyl polystyrene or polyvinyl chloride is between 10 and 70 percent by weight of the mixed solution.

In a class of this embodiment, the organic solvent in 1) is meta-xylene or N,N-dimethyl formamide.

In a class of this embodiment, the nanoparticles in 1) are iron oxide nanoparticles, manganese oxide nanoparticles, zero-valent iron nanoparticles, or/and noble metal nanoparticles; a diameter of each of the nanoparticles is between 1 and 40 nm; and a weight of the nanoparticles accounts for between 0.01 and 0.3-fold of a total weight of the linear polyethylene and chloromethyl polystyrene or polyvinyl chloride.

In a class of this embodiment, the noble metal is gold, silver, platinum, or palladium.

In a class of this embodiment, the alcohol solution in 2) is methanol; and a volume ratio of the alcohol solution to the mixed solution of 1) of between 5:1 and 20:1.

In a class of this embodiment, the amine solution of 3) is an ethanol solution comprising ethylenediamine, 1,4-butanediamine, 1,5-pentanediamine, or 1,6-hexanediamine; a weight of ethylenediamine, 1,4-butanediamine, 1,5-pentanediamine, or 1,6-hexanediamine accounts for between 2 and 15 percent by weight of the amine solution; and a volume of the amine solution is equal to a volume of the mixed solution obtained from 1).

In accordance with still another embodiment of the invention, there is provided a method for treating sewage comprising applying the above resin nanocomposite.

Advantages of the resin nanocomposite, the method for preparing the same, and the method for treating the sewage by using the same according to embodiments of the invention are summarized as follows:

1) The method for preparing the resin nanocomposite is based on the microphase separation and includes: pre-mixing, cold crystallization for pore formation, and cross-linking and amination. The method is simple, easily controllable, and apt to industrialized production.

2) The resin nanocomposite has abundant, uniform, and ordered pore structures with a specific area of between 50 and 300 $m^2/g$. The pore structures are primarily mesoporous structures, and a pore size is controllable and between 5 and 40 nm. The uniform and ordered pore structures are helpful to improve the working performance of the composite material in sewage treatment, and to improve the structure uniformity, the structure-activity relationship, and the whole working performance of the nanocomposite.

3) The resin nanocomposite according to embodiments of the invention possesses charging functional groups with high hydrophilicity, thus being beneficial for the diffusion of polar substances in the resin phase and being applicable to the water phase system.

4) The ion exchange capacity of the resin nanocomposite is controllable in a relatively large scope. The ion exchange capacity is controllable within the range of between 0.5 and 3.0 mmol/g, and it only requires adjusting a ratio of the chloromethyl polystyrene or the polyvinyl chloride in the polymer solution. The content of the nanoparticles of the composite material is easily controllable within the range of between 1 and 30 wt. %, and it only requires adjusting the percent by weight of the nanoparticles in the mixed solution.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a resin nanocomposite, a method for preparing the same, and a method for treating sewage are described below. It should be noted that the following examples are intended to describe and not to limit the invention.

Example 1

1) 30 g of a polystyrene having a molecular weight of 190 thousand and 10 g of a chloromethyl polystyrene were mixed and dissolved in 200 mL of N,N-dimethylformamide. Then, 6 g of iron oxide nanoparticles (self-made) having an average diameter of 5 nm was added and stirred to be fully dissolved to yield a mixed solution.

2) 1000 mL of methanol was added to liquid nitrogen in batches. After methanol was completely condensed, the mixed solution was gradually dropped into the liquid nitrogen. A resulting mixture was stood for 16 hrs to make the liquid nitrogen evaporated and methanol completely molten. Thereafter, resin beads in solid forms were collected, washed by ethanol for several times, and dried to yield solid balls.

3) The solid balls were added to an ethanol solution comprising 1,6-hexanediamine, in which a weight of 1,6-hexanediamine accounts for 10 percent by weight of a total ethanol solution. After 24 hrs of treatment at 50° C., resulting products were washed by ethanol for several times, and dried at 50° C. to yield the resin nanocomposite.

Figure 1:
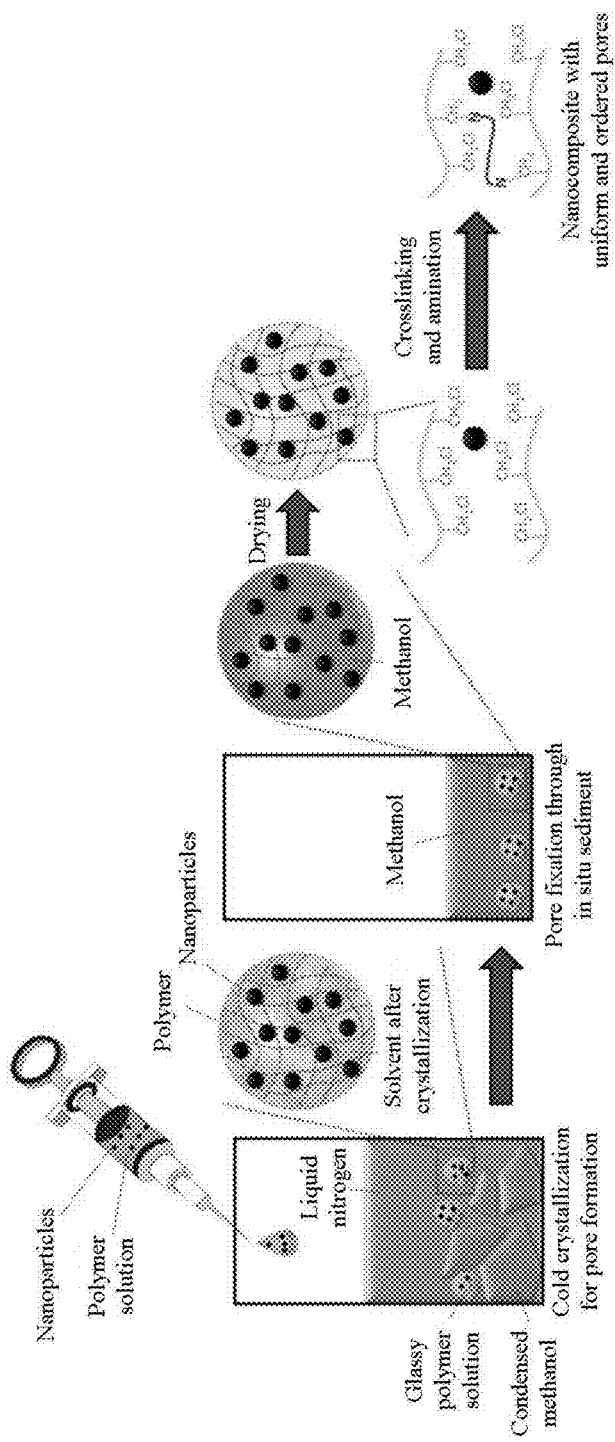
FIG. 1 is a flow chart of a method for preparing a resin nanocomposite in accordance with one embodiment of the invention.
Figure 2:
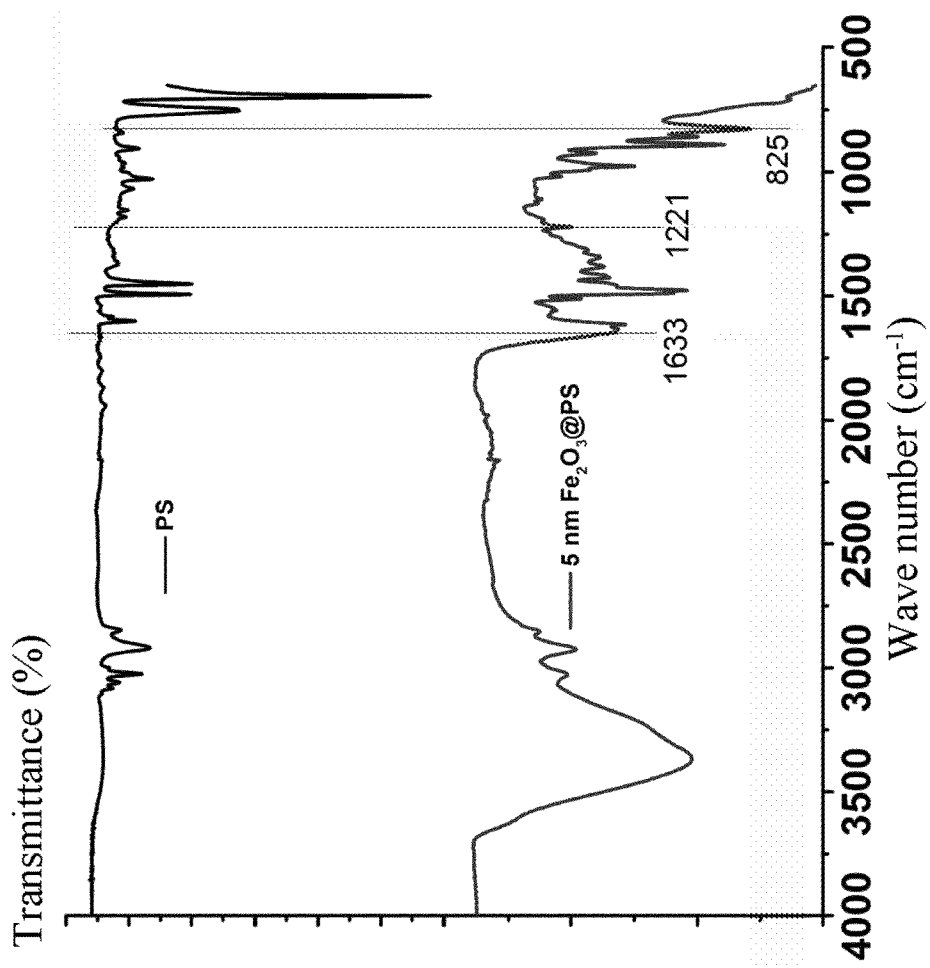
FIG. 2 is an infrared spectrum (FT-IR) of a resin nanocomposite (5 nm $Fe_2O_3$@PS) prepared in Example 1.
Figure 3:
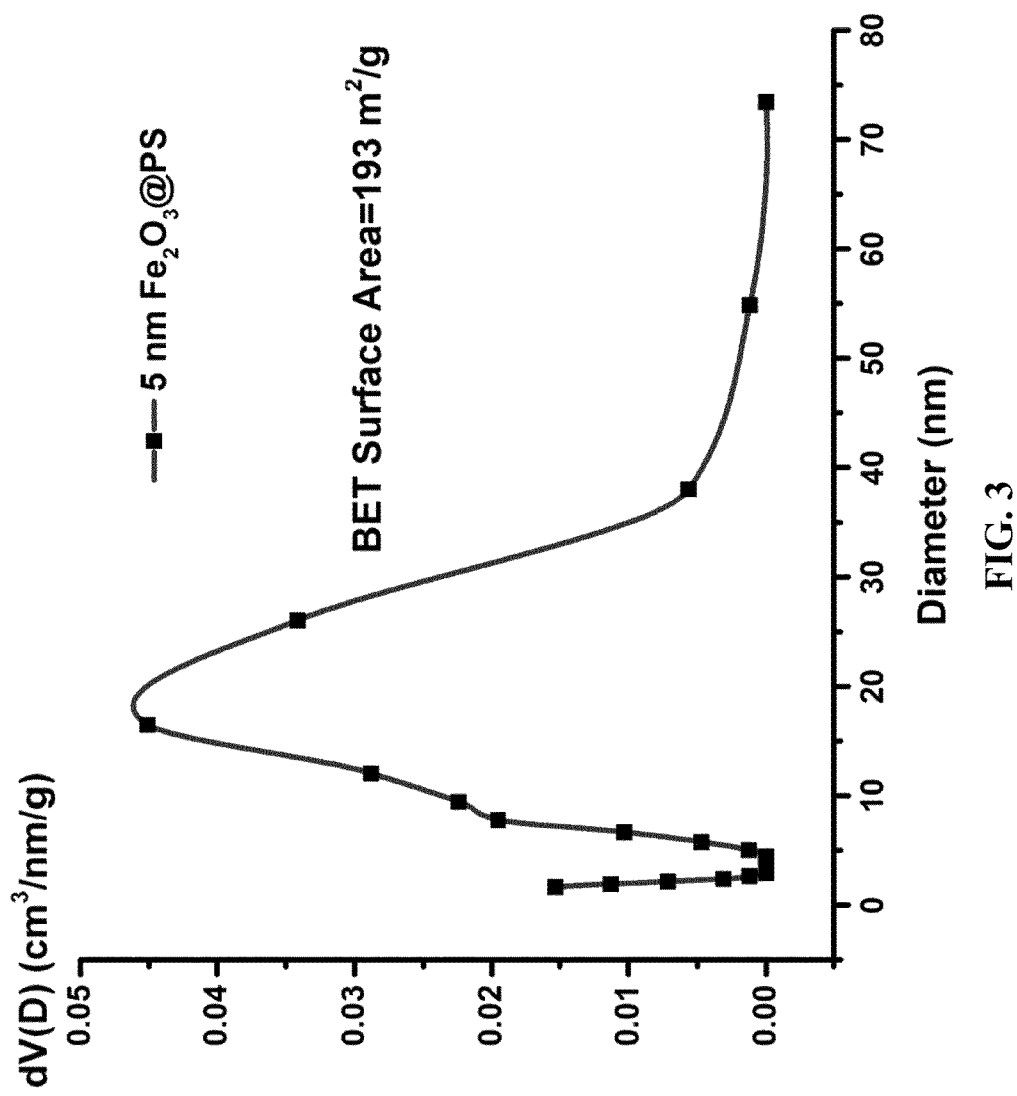
FIG. 3 is a pore size distribution graph of a resin nanocomposite (5 nm $Fe_2O_3$@PS) prepared in Example 1.
Figure 4:
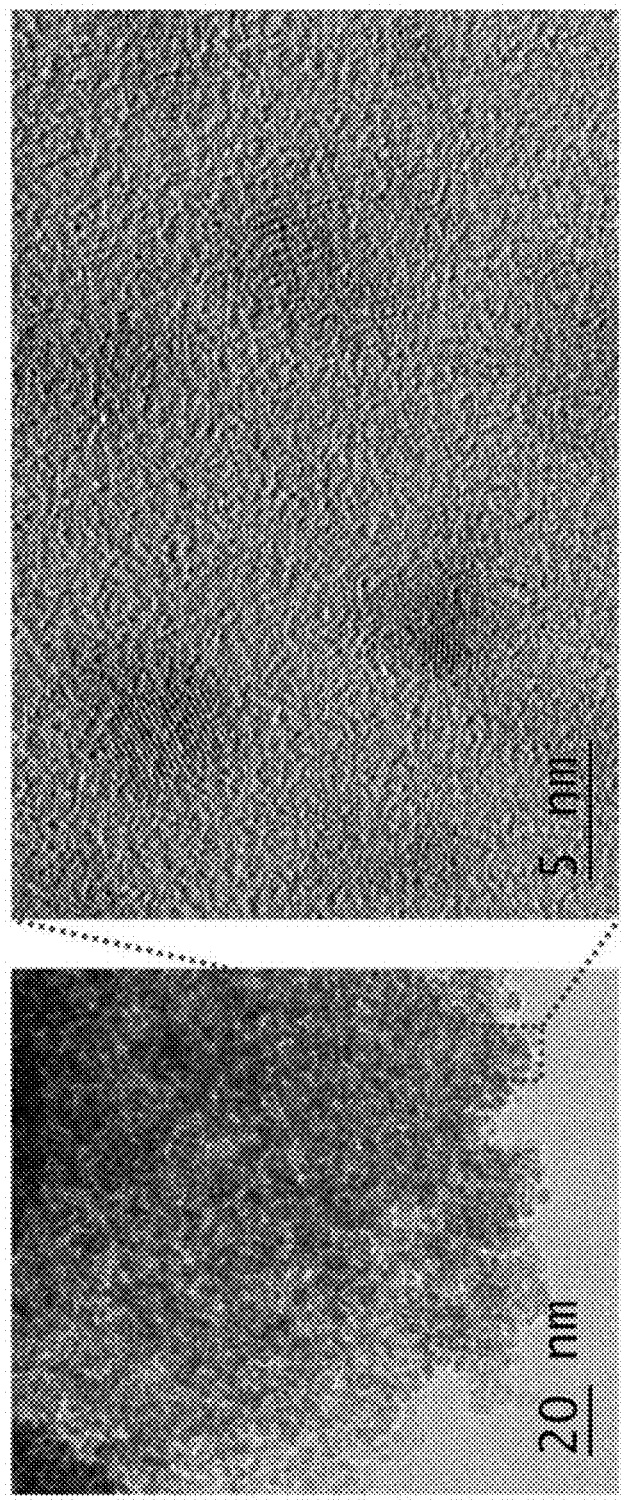
FIG. 4 is a transmission electron microscopy of a resin nanocomposite (5 nm $Fe_2O_3$@PS) prepared in Example 1.

The resin nanocomposite prepared in this example were spherical, red-brown, and a diameter was approximately 1.7 mm. An infrared spectrum of the resin nanocomposite was shown in FIG. 2, in which, most absorption peaks were the same as polystyrene, but new peaks appeared at 1633 $cm^{-1}$, 1221 $cm^{-1}$, and 825 $cm^{-1}$ respectively corresponded to a N—H bending vibration, a C—N stretching vibration, and Fe—O. This demonstrated that a resin skeleton structure of the nanocomposite was aminated polystyrene, and the nanocomposite also contained iron oxide nanoparticles. By measuring the pore structures using a $N_2$-adsorption desorption instrument, it was known that a specific area of the composite material was 193 $m^2/g$, a pore size was approximately 20 nm, and pore distribution of the composite material was shown in FIG. 3. It was observed under the transmission electron microscopy that a large quantity of iron oxide nanoparticles having the diameter of 5 nm were distributed in the composite material, as shown in FIG. 4. A total ion exchange capacity was measured to be 1.1 mmol/g by using a titration method, and an iron content was measured to be 10 wt. % by using an atomic absorption spectrometry after acid digestion of the nanocomposite.

Example 2

The preparation of the resin nanocomposite of this example is the same as that of Example 1 except that the iron oxide nanoparticles (self-made) having the average diameter of 5 nm was substituted by iron oxide nanoparticles (self-made) having a diameter of 10 nm.

Figure 5:
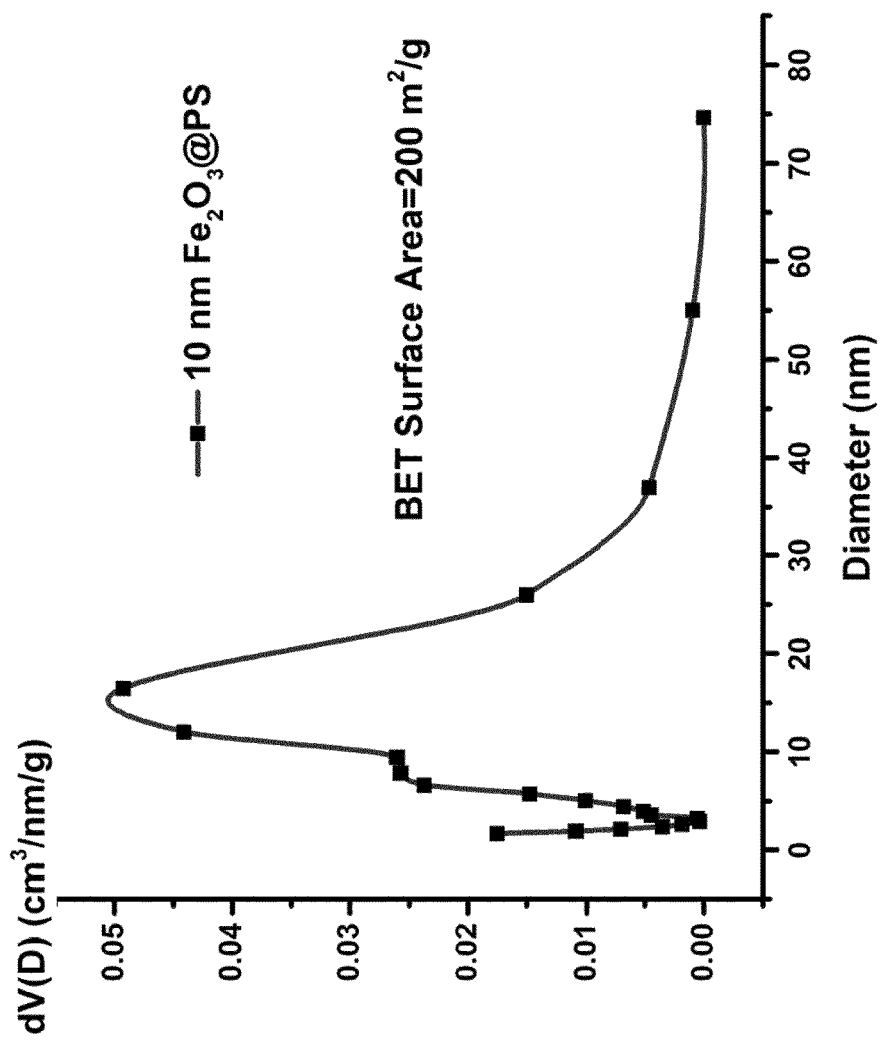
FIG. 5 is a pore size distribution graph of a resin nanocomposite (10 nm $Fe_2O_3$@PS) prepared in Example 2.
Figure 6:
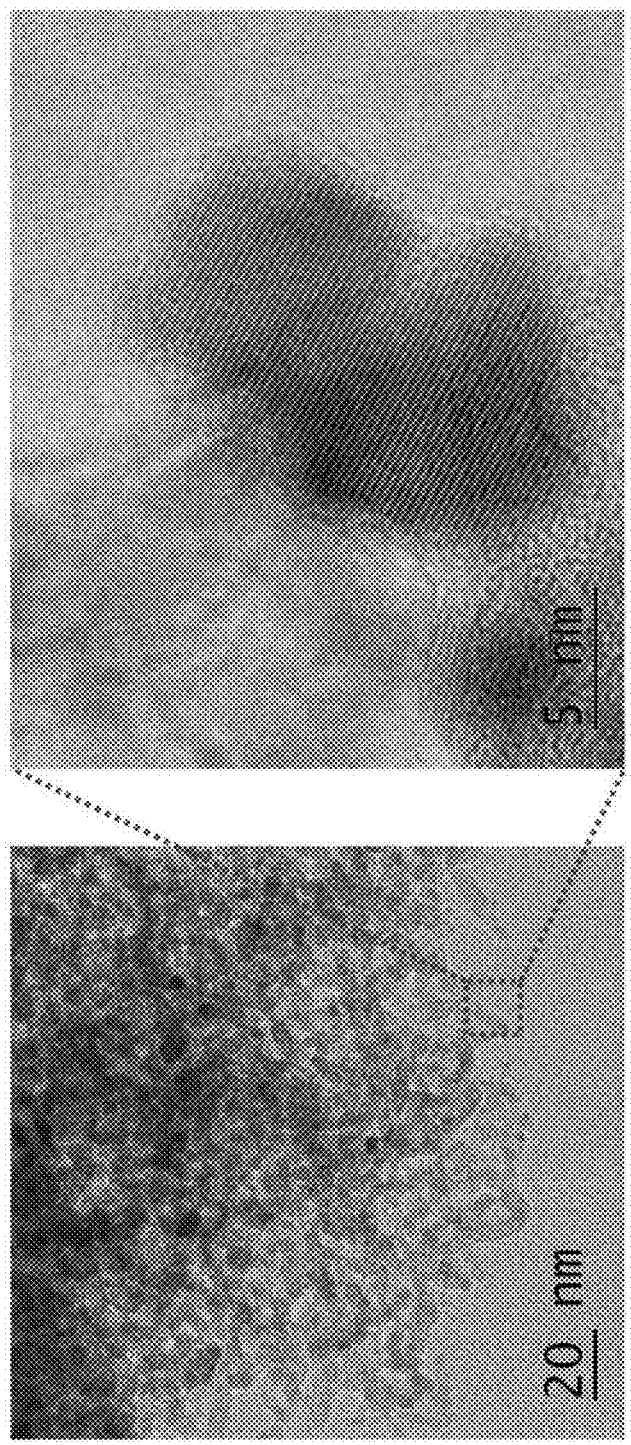
FIG. 6 is a transmission electron microscopy of a resin nanocomposite (10 nm $Fe_2O_3$@PS) prepared in Example 2.

The resin nanocomposite prepared in this example were spherical, red-brown, and a diameter was approximately 1.7 mm. An infrared spectrum of the resin nanocomposite indicated that most absorption peaks were the same as polystyrene, but new peaks appeared at 1635 $cm^{-1}$, 1223 $cm^{-1}$, and 820 $cm^{-1}$ respectively corresponded to a N—H bending vibration, a C—N stretching vibration, and Fe—O. This demonstrated that a resin skeleton structure of the nanocomposite was aminated polystyrene, and the nanocomposite also contained iron oxide nanoparticles. By measuring the pore structures using a $N_2$-adsorption desorption instrument, it was known that a specific area of the composite material was 200 m²/g, a pore size was approximately 21 nm, and pore distribution of the composite material was shown in FIG. 5. It was observed under the transmission electron microscopy that a large quantity of iron oxide nanoparticles having the diameter of 10 nm were distributed in the composite material, as shown in FIG. 6. A total ion exchange capacity was measured to be 1.1 mmol/g by using a titration method, and an iron content was measured to be 10 wt. % by using an atomic absorption spectrometry after acid digestion of the nanocomposite.

Example 3

The preparation of the resin nanocomposite of this example is the same as that of Example 1 except that the iron oxide nanoparticles (self-made) having the average diameter of 5 nm was substituted by iron oxide nanoparticles (self-made) having a diameter of 30 nm.

Figure 7:
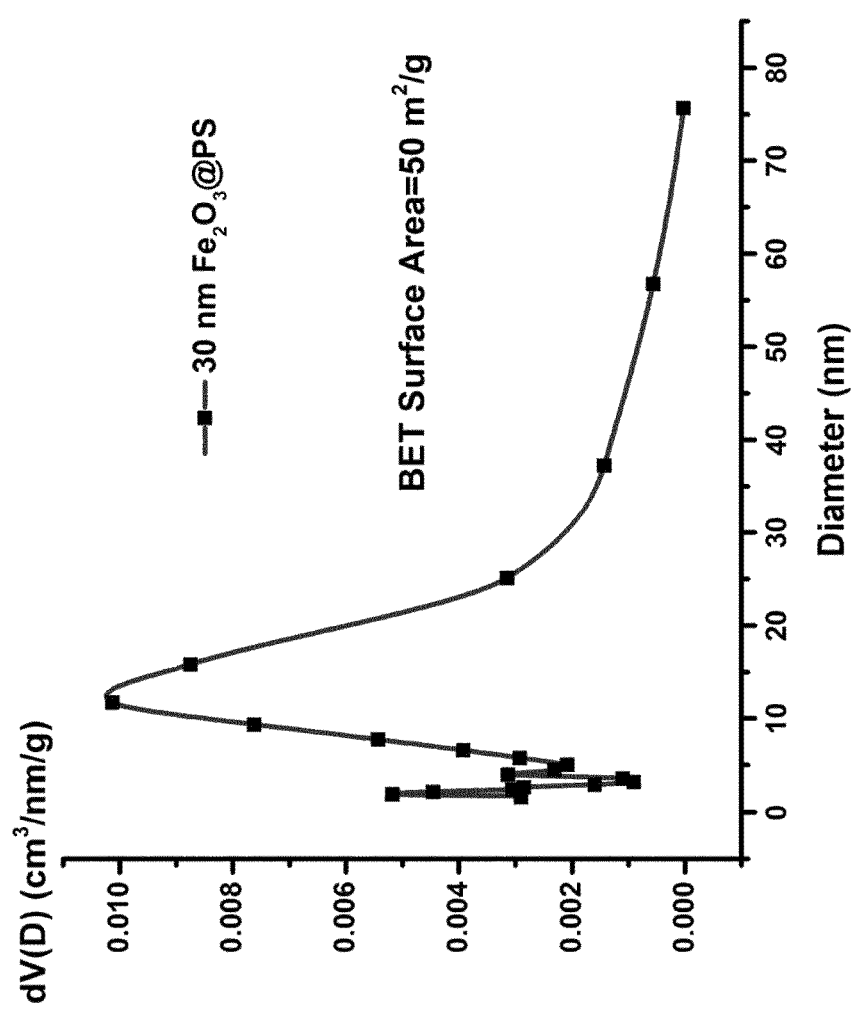
FIG. 7 is a pore size distribution graph of a resin nanocomposite (30 nm $Fe_2O_3$@PS) prepared in Example 3.
Figure 8:
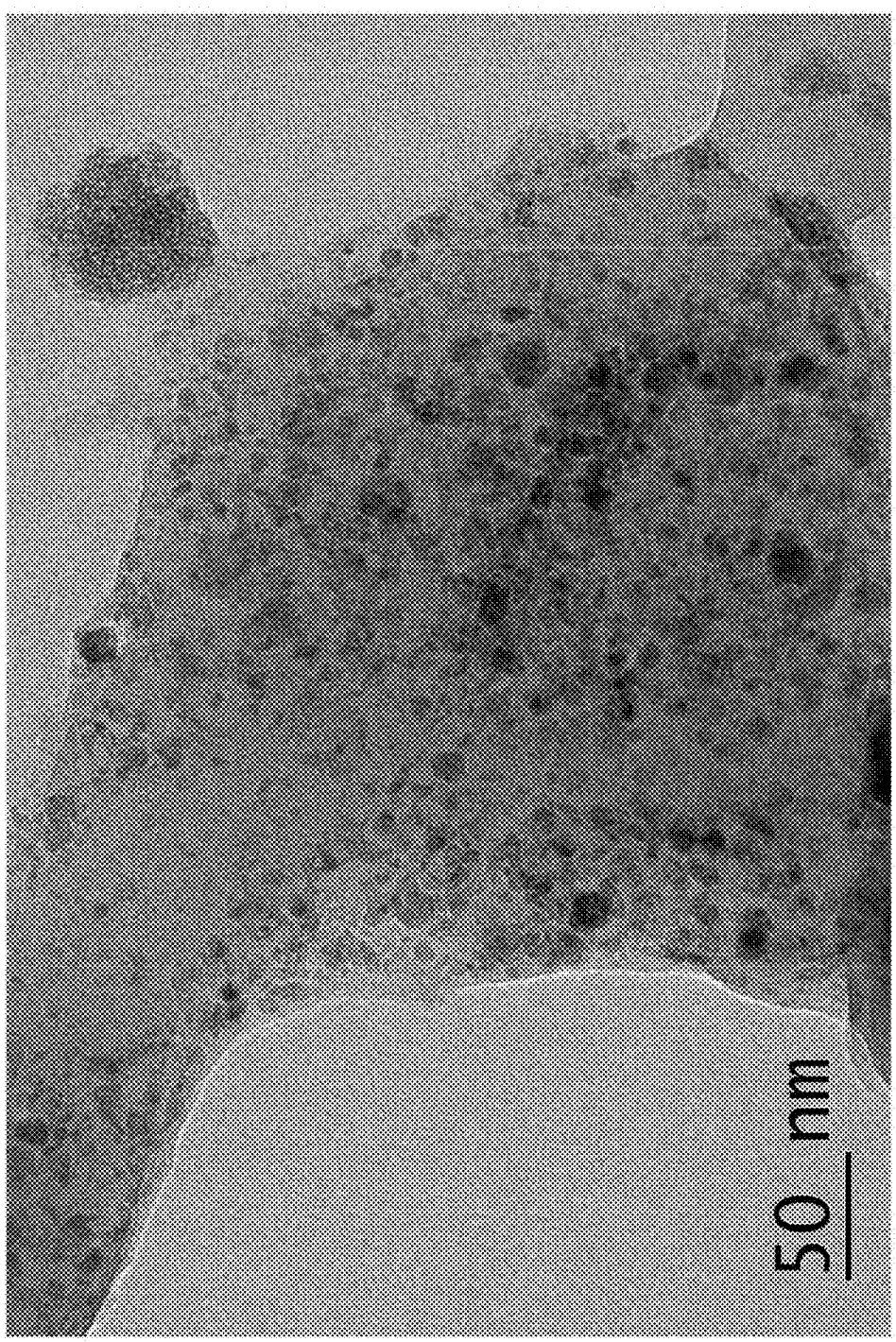
FIG. 8 is a transmission electron microscopy of a resin nanocomposite (30 nm $Fe_2O_3$@PS) prepared in Example 3.

The resin nanocomposite prepared in this example were spherical, red-brown, and a diameter was approximately 2.7 mm. An infrared spectrum of the resin nanocomposite indicated that most absorption peaks were the same as polystyrene, but new peaks appeared at 1643 cm$^{-1}$, 1230 cm$^{-1}$, and 828 cm$^{-1}$ respectively corresponded to a N—H bending vibration, a C—N stretching vibration, and Fe—O. This demonstrated that a resin skeleton structure of the nanocomposite was aminated polystyrene, and the nanocomposite also contained iron oxide nanoparticles. By measuring the pore structures using a N$_2$-adsorption desorption instrument, it was known that a specific area of the composite material was 50 m²/g, a pore size was approximately 11 nm, and pore distribution of the composite material was shown in FIG. 7. It was observed under the transmission electron microscopy that a large quantity of iron oxide nanoparticles having the diameter of 30 nm were distributed in the composite material, as shown in FIG. 8. A total ion exchange capacity was measured to be 1.1 mmol/g by using a titration method, and an iron content was measured to be 10 wt. % by using an atomic absorption spectrometry after acid digestion of the nanocomposite.

Example 4

The preparation of the resin nanocomposite of this example is the same as that of Example 1 except that the iron oxide nanoparticles (self-made) having the average diameter of 5 nm was substituted by manganese oxide nanoparticles (self-made) having a diameter of 40 nm.

The resin nanocomposite prepared in this example were spherical, black, and a diameter was approximately 1.5 mm. An infrared spectrum of the resin nanocomposite indicated that most absorption peaks were the same as polystyrene, but new peaks appeared at 1630 cm$^{-1}$, 1200 cm$^{-1}$, and 560 cm$^{-1}$ respectively corresponded to a N—H bending vibration, a C—N stretching vibration, and Mn—O. This demonstrated that a resin skeleton structure of the nanocomposite was aminated polystyrene, and the nanocomposite also contained manganese oxide nanoparticles. By measuring the pore structures using a N$_2$-adsorption desorption instrument, it was known that a specific area of the composite material was 300 m²/g, a pore size was approximately 25 mm. A total ion exchange capacity was measured to be 1.1 mmol/g by using a titration method, and a manganese content was measured to be 12 wt. % by using an atomic absorption spectrometry after acid digestion of the nanocomposite.

Example 5

The preparation of the resin nanocomposite of this example is the same as that of Example 1 except that the 30 g of the polystyrene having the molecular weight of 190 thousand was substituted by 40 g of the polystyrene having the molecular weight of 190 thousand.

The resin nanocomposite prepared in this example were spherical, red-brown, and a diameter was approximately 1.7 mm. An infrared spectrum of the resin nanocomposite indicated that most absorption peaks were the same as polystyrene, but new peaks appeared at 1633 cm$^{-1}$, 1221 cm$^{-1}$, and 825 cm$^{-1}$ respectively corresponded to a N—H bending vibration, a C—N stretching vibration, and Fe—O. This demonstrated that a resin skeleton structure of the nanocomposite was aminated polystyrene, and the nanocomposite also contained iron oxide nanoparticles. By measuring the pore structures using a N$_2$-adsorption desorption instrument, it was known that a specific area of the composite material was 150 m²/g, a pore size was approximately 10 nm. A total ion exchange capacity was measured to be 0.75 mmol/g by using a titration method, and an iron content was measured to be 8 wt. % by using an atomic absorption spectrometry after acid digestion of the nanocomposite.

Example 6

The preparation of the resin nanocomposite of this example is the same as that of Example 1 except that the 10 g of the chloromethyl polystyrene was substituted by 20 g of the chloromethyl polystyrene.

The resin nanocomposite prepared in this example were spherical, red-brown, and a diameter was approximately 0.5 mm. An infrared spectrum of the resin nanocomposite indicated that most absorption peaks were the same as polystyrene, but new peaks appeared at 1638 cm$^{-1}$, 1223 cm$^{-1}$, and 825 cm$^{-1}$ respectively corresponded to a —N—H bending vibration, a C—N stretching vibration, and Fe—O. This demonstrated that a resin skeleton structure of the nanocomposite was aminated polystyrene, and the nanocomposite also contained iron oxide nanoparticles. By measuring the pore structures using a N$_2$-adsorption desorption instrument, it was known that a specific area of the composite material was 170 m²/g, a pore size was approximately 10 nm. A total ion exchange capacity was measured to be 3.0 mmol/g by using a titration method, and an iron content was measured to be 9 wt. % by using an atomic absorption spectrometry after acid digestion of the nanocomposite.

Example 7

The preparation of the resin nanocomposite of this example is the same as that of Example 1 except that the iron oxide nanoparticles (self-made) having the average diameter of 5 nm was substituted by silver nanoparticles (self-made) having a diameter of 1 nm.

The resin nanocomposite prepared in this example were spherical, black, and a diameter was approximately 2.1 mm. An infrared spectrum of the resin nanocomposite indicated that most absorption peaks were the same as polystyrene, but new peaks appeared at 1633 cm$^{-1}$, 1221 cm$^{-1}$, and 625 cm$^{-1}$ respectively corresponded to a N—H bending vibration, a C—N stretching vibration, and Ag. This demonstrated that a resin skeleton structure of the nanocomposite was aminated polystyrene, and the nanocomposite also contained silver nanoparticles. By measuring the pore structures using a N$_2$-adsorption desorption instrument, it was known that a specific area of the composite material was 270 m²/g, a pore size was approximately 35 nm. A total ion exchange capacity was measured to be 1.1 mmol/g by using a titration method, and a silver content was measured to be 16 wt. % by using inductively coupled plasma-atomic emission spectrometry after acid digestion of the nanocomposite.

Example 8

The preparation of the resin nanocomposite of this example is the same as that of Example 1 except that the polystyrene having the molecular weight of 190 thousand was substituted by a polystyrene having the molecular weight of 500 thousand.

The resin nanocomposite prepared in this example were spherical, red-brown, and a diameter was approximately 2.7 mm. An infrared spectrum of the resin nanocomposite indicated that most absorption peaks were the same as polystyrene, but new peaks appeared at 1633 $cm^{-1}$, 1221 $cm^{-1}$, and 825 $cm^{-1}$ respectively corresponded to a —N—H bending vibration, a C—N stretching vibration, and Fe—O. This demonstrated that a resin skeleton structure of the nanocomposite was aminated polystyrene, and the nanocomposite also contained iron oxide nanoparticles. By measuring the pore structures using a $N_2$-adsorption desorption instrument, it was known that a specific area of the composite material was 290 $m^2/g$, a pore size was approximately 40 nm. A total ion exchange capacity was measured to be 1.2 mmol/g by using a titration method, and an iron content was measured to be 11 wt. % by using an atomic absorption spectrometry after acid digestion of the nanocomposite.

Example 9

The preparation of the resin nanocomposite of this example is the same as that of Example 1 except that the polystyrene having the molecular weight of 190 thousand was substituted by a polystyrene having the molecular weight of 1 million.

The resin nanocomposite prepared in this example were spherical, red-brown, and a diameter was approximately 2.1 mm. An infrared spectrum of the resin nanocomposite indicated that most absorption peaks were the same as polystyrene, but new peaks appeared at 1633 $cm^{-1}$, 1221 $cm^{-1}$, and 825 $cm^{-1}$ respectively corresponded to a —N—H bending vibration, a C—N stretching vibration, and Fe—O. This demonstrated that a resin skeleton structure of the nanocomposite was aminated polystyrene, and the nanocomposite also contained iron oxide nanoparticles. By measuring the pore structures using a $N_2$-adsorption desorption instrument, it was known that a specific area of the composite material was 240 $m^2/g$, a pore size was approximately 23 nm. A total ion exchange capacity was measured to be 1.1 mmol/g by using a titration method, and an iron content was measured to be 10 wt. % by using an atomic absorption spectrometry after acid digestion of the nanocomposite.

Example 10

The preparation of the resin nanocomposite of this example is the same as that of Example 1 except that the 1,6-hexanediamine was substituted by ethylenediamine.

The resin nanocomposite prepared in this example were spherical, red-brown, and a diameter was approximately 1.5 mm. An infrared spectrum of the resin nanocomposite indicated that most absorption peaks were the same as polystyrene, but new peaks appeared at 1630 $cm^{-1}$, 1230 $cm^{-1}$, and 830 $cm^{-1}$ respectively corresponded to a —N—H bending vibration, a C—N stretching vibration, and Fe—O. This demonstrated that a resin skeleton structure of the nanocomposite was aminated polystyrene, and the nanocomposite also contained iron oxide nanoparticles. By measuring the pore structures using a $N_2$-adsorption desorption instrument, it was known that a specific area of the composite material was 300 $m^2/g$, a pore size was approximately 5 nm. A total ion exchange capacity was measured to be 1.1 mmol/g by using a titration method, and an iron content was measured to be 11 wt. % by using an atomic absorption spectrometry after acid digestion of the nanocomposite.

Example 11

The preparation of the resin nanocomposite of this example is the same as that of Example 1 except that the 1,6-hexanediamine was substituted by 1,4-butanediamine.

The resin nanocomposite prepared in this example were spherical, red-brown, and a diameter was approximately 2.3 mm. An infrared spectrum of the resin nanocomposite indicated that most absorption peaks were the same as polystyrene, but new peaks appeared at 1645 $cm^{-1}$, 1225 $cm^{-1}$, and 820 $cm^{-1}$ respectively corresponded to a —N—H bending vibration, a C—N stretching vibration, and Fe—O. This demonstrated that a resin skeleton structure of the nanocomposite was aminated polystyrene, and the nanocomposite also contained iron oxide nanoparticles. By measuring the pore structures using a $N_2$-adsorption desorption instrument, it was known that a specific area of the composite material was 185 $m^2/g$, a pore size was approximately 26 nm. A total ion exchange capacity was measured to be 1.2 mmol/g by using a titration method, and an iron content was measured to be 10 wt. % by using an atomic absorption spectrometry after acid digestion of the nanocomposite.

Example 12

The preparation of the resin nanocomposite of this example is the same as that of Example 1 except that the 1,6-hexanediamine was substituted by 1,5-pentanediamine.

The resin nanocomposite prepared in this example were spherical, red-brown, and a diameter was approximately 2.3 mm. An infrared spectrum of the resin nanocomposite indicated that most absorption peaks were the same as polystyrene, but new peaks appeared at 1640 $cm^{-1}$, 1230 $cm^{-1}$, and 825 $cm^{-1}$ respectively corresponded to a —N—H bending vibration, a C—N stretching vibration, and Fe—O. This demonstrated that a resin skeleton structure of the nanocomposite was aminated polystyrene, and the nanocomposite also contained iron oxide nanoparticles. By measuring the pore structures using a $N_2$-adsorption desorption instrument, it was known that a specific area of the composite material was 215 $m^2/g$, a pore size was approximately 16 nm. A total ion exchange capacity was measured to be 1.2 mmol/g by using a titration method, and an iron content was measured to be 10 wt. % by using an atomic absorption spectrometry after acid digestion of the nanocomposite.

Example 13

In order to demonstrate the advantages of the resin nanocomposite of the invention, the behavior of the nanocomposite in absorbing the pentavalent arsenic (As(V)) from water was observed. The resin nanocomposite selected was the material (labeled as 5 nm $Fe_2O_3$@PS) prepared in Example 1. By adopting methods similar to the above examples, mesoporous un-aminated nanocomposite (labeled as 5 nm $Fe_2O_3$@PS-2) (preparation steps were the same as Example 1 except that step 3) was deleted) and nonporous un-aminated nanocomposite (labeled as 5 nm $Fe_2O_3$@PS-3)

(preparation steps were the same as Example 1 except that step 3) was deleted, and no liquid nitrogen was used in step 2)) were prepared and used as contrasts. Specific experiments were carried out as follows:

1000 mL of sodium arsenate solution was prepared, and a mass concentration of As(V) was 1 mg/L. 0.1 M NaOH solution and 0.1 M HCl solution were used to regulate the pH value to be in the vicinity of 6.0. The three nanocomposites were respectively added to three samples of sodium arsenate solution, and a solid-liquid ratio was 0.5 g/L. Resulting solution were shaken at 25° C., and 0.5 mL of the solution was collected every certain period and the mass concentration of As(V) remaining in the solution was measured to evaluate the removal rate of As(V) by the nanocomposite.

Figure 9:
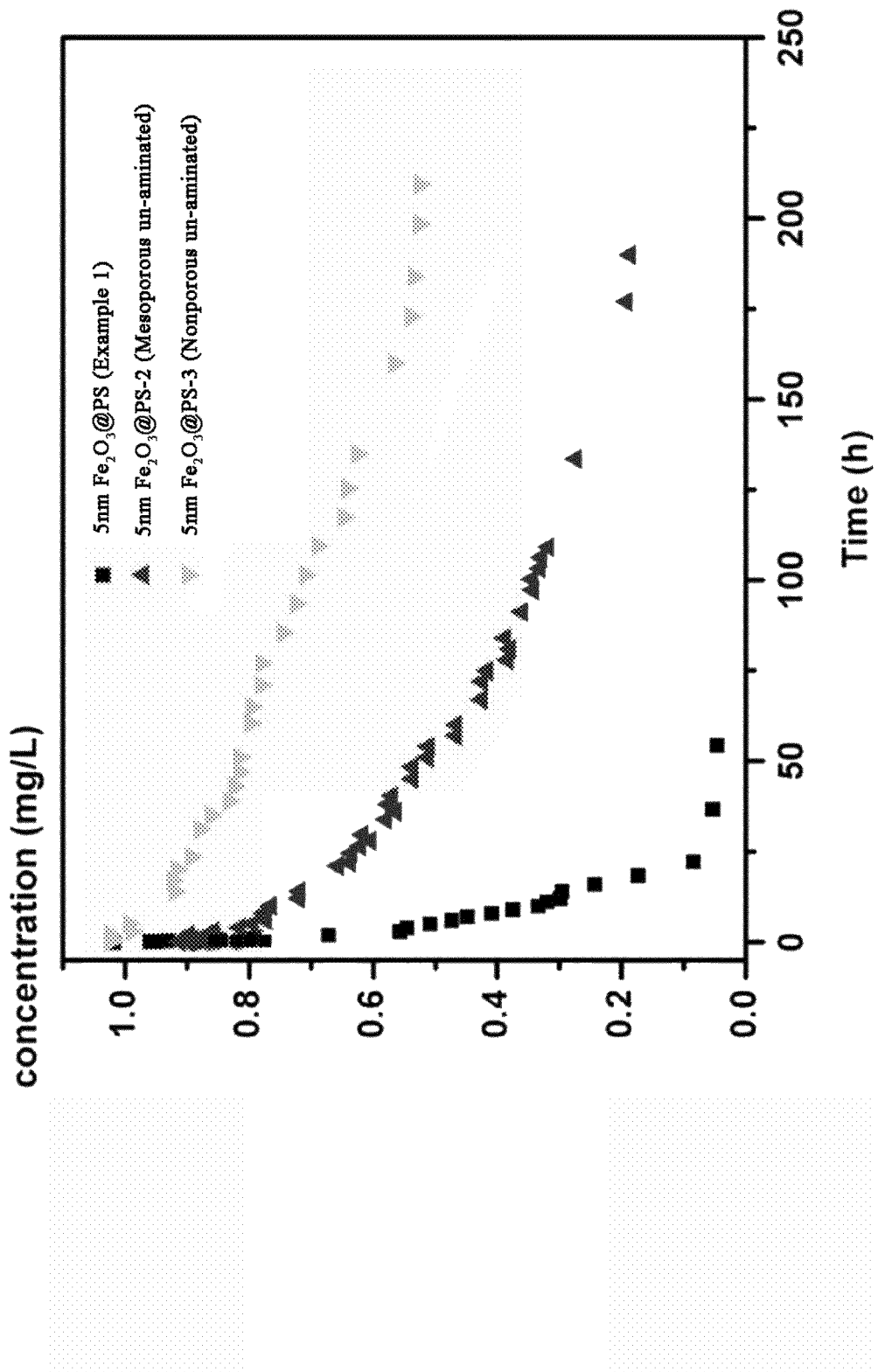
FIG. 9 is a chart showing comparison of arsenic removal effect between a resin nanocomposite (5 nm $Fe_2O_3$@PS) prepared in Example 1 and other materials.

Experiment results were shown in FIG. 9 that the performance of the resin nanocomposite (5 nm $Fe_2O_3$@PS) was significantly improved in both the absorption quantity and the absorption rate compared with other materials. The absorption quantity of the 5 nm $Fe_2O_3$@PS-2 was much higher than that of the 5 nm $Fe_2O_3$@PS-3 because that the abundant mesoporous structures made the available sites of iron oxide nanoparticles in the nanocomposite greatly improved. Compared with the 5 nm $Fe_2O_3$@PS-2, the absorption quantity of the 5 nm $Fe_2O_3$@PS was improved due that the decorated amino groups were able to absorb a part of As(V) by the ion exchange action, the absorption rate of the 5 nm $Fe_2O_3$@PS was obvious faster, and a balance time was shortened from more than 200 hrs to approximately 20 hrs, which was because that the amination made the hydrophilicity of the nanocomposite greatly improved and this was beneficial for the dispersion of As(V) in the pore channels of the nanocomposite.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a resin nanocomposite, the method comprising:
   1) mixing and dissolving a linear polyethylene with a chloromethyl polystyrene in an organic solvent to yield a polymer solution, and adding nanoparticles to the polymer solution to yield a mixed solution;
   2) adding an alcohol solution to liquid nitrogen; adding the mixed solution obtained from 1) dropwise to the liquid nitrogen to yield a mixture after the alcohol solution is completely condensed; allowing the mixture to stand for between 5 and 48 hrs until the liquid nitrogen is evaporated and the alcohol solution is completely melted; collecting resin beads therefrom, washing the resin beads for between 3 and 5 times with an alcohol, and drying the resin beads to yield a composite material; and
   3) soaking the composite material obtained from 2) in an amine solution at 50° C. for 24 hrs, washing a resulting product with an alcohol solution for between 3 and 5 times, and drying to yield a resin nanocomposite comprising a resin skeleton structure and nanoparticles, wherein the resin skeleton structure is an aminated polystyrene; the nanoparticles are dispersed in the resin skeleton structure; a specific area of the resin nanocomposite is between 50 and 300 $m^2/g$; and a pore size of the resin nanocomposite is between 5 and 40 nm.

2. The method of claim 1, wherein in 1), the linear polyethylene in 1) has a molecular weight of between 190,000 and 1,000,000; a weight of the chloromethyl polystyrene is between 0.15 and 0.8 fold of a weight of the linear polyethylene; and a total weight of the linear polyethylene and the chloromethyl polystyrene is between 10 and 70 percent by weight of the mixed solution.

3. The method of claim 2, wherein the organic solvent in 1) is meta-xylene or N,N-dimethyl formamide.

4. The method of claim 1, wherein the organic solvent in 1) is meta-xylene or N,N-dimethyl formamide.

5. The method of claim 1, wherein the nanoparticles in 1) are iron oxide nanoparticles, manganese oxide nanoparticles, zero-valent iron nanoparticles, noble metal nanoparticles, or a mixture thereof; a diameter of each of the nanoparticles is between 1 and 40 nm; and a weight of the nanoparticles is between 0.01 and 0.3 fold of a total weight of the linear polyethylene and chloromethyl polystyrene.

6. The method of claim 5, wherein the noble metal nanoparticles are gold nanoparticles, silver nanoparticles, platinum nanoparticles, or palladium nanoparticles.

7. The method of claim 1, wherein the alcohol solution in 2) is methanol; and a volume ratio of the alcohol solution to the mixed solution of 1) is between 5:1 and 20:1.

8. The method of claim 1, wherein the amine solution of 3) is an ethanol solution comprising ethylenediamine, 1,4-butanediamine, 1,5-pentanediamine, or 1,6-hexanediamine; a weight of ethylenediamine, 1,4-butanediamine, 1,5-pentanediamine, or 1,6-hexanediamine is between 2 and 15 percent by weight of the amine solution; and a volume of the amine solution is equal to a volume of the mixed solution obtained from 1).

9. The method of claim 1, wherein an anion exchange capacity of the resin nanocomposite is between 0.5 and 3.0 mmol/g, and the nanoparticles are between 1 and 30 percent by weight of a total weight of the resin nanocomposite.

10. The method of claim 9, wherein characteristic absorption peaks are present at 1650-1630 $cm^{-1}$, 1230-1200 $cm^{-1}$, and 0-1000 $cm^{-1}$ in an infrared spectrum of the resin nanocomposite and respectively correspond to an N—H bending vibration, a C—N stretching vibration, and the nanoparticles.

11. The method of claim 1, wherein characteristic absorption peaks are present at 1650-1630 $cm^{-1}$, 1230-1200 $cm^{-1}$, and 0-1000 $cm^{-1}$ in an infrared spectrum of the resin nanocomposite and respectively correspond to an N—H bending vibration, a C—N stretching vibration, and the nanoparticles.

* * * * *